Figure 1:
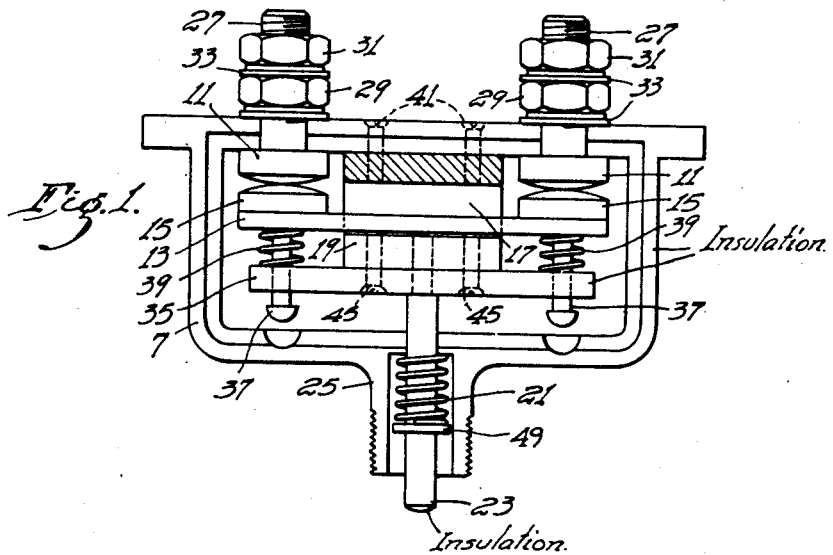

April 19, 1949.                 B. O. AUSTIN                 2,467,720
                                CIRCUIT BREAKER
                             Filed Sept. 28, 1944

WITNESSES:                                              INVENTOR
                                                     Baxum O. Austin
                                                     BY
                                                     Ralph H. Swingle
                                                            ATTORNEY Patented Apr. 19, 1949

2,467,720

UNITED STATES PATENT OFFICE 2,467,720

CIRCUIT BREAKER

Bascum O. Austin, Lima, Ohio, assignor to Westinghouse Electric Corporation, East Pittsburgh, Pa., a corporation of Pennsylvania Application September 28, 1944, Serial No. 556,142

10 Claims. (Cl. 200—87)

The invention relates to electrical protective devices for automatically interrupting reverse current power to a generator on direct-current electrical power systems.

The invention is particularly applicable to the electrical power system on multi-engined aircraft and other crafts and vehicles having a direct-current generator associated with each engine, the generators operating in parallel. The electrical devices heretofore used on such craft have not been adequate at all times to clear a faulty generator. In the case of a two-engined craft, the failure of one generator in such a fashion as to draw power from the main bus causes the other generator to be severely overloaded and may result in destruction or damage to both generators and complete failure of the direct-current power system of the craft.

An object of the present invention is the provision of a direct-current power system for aircraft or other craft with improved electrical protective devices for automatically interrupting reverse flow of power to the generator or generators of the system.

Another object of the invention is the provision of a direct-current power system, of the type having a plurality of generators operating in parallel, with improved circuit breaker means for each generator automatically operable to disconnect its corresponding generator from the system in response to reverse flow of power to the generator.

Another object of the invention is the provision of an improved directional-current circuit breaker for direct-current power systems which will automatically interrupt the circuit in response to reverse flow of current therethrough.

Another object of the invention is the provision of an improved manually and automatically operable circuit breaker for direct-current electrical power systems which is manually operable to closed position and will remain in closed position during flow of current therethrough in the proper direction and which will automatically open and interrupt the circuit in response to reverse flow of current.

Another object of the invention is the provision of an improved directional-current circuit breaker which is of very simple and inexpensive construction, reliable in operation, and which is compact and light in weight.

The above and other objects and advantages of the invention will be apparent from the following description of one preferred embodiment of the invention when read in conjunction with the accompanying drawing in which, Fig. 1 is a side elevational view of a circuit breaker constructed in accordance with the invention, one part of the casing being removed, and the magnet being shown partly in section.

Figure 2:
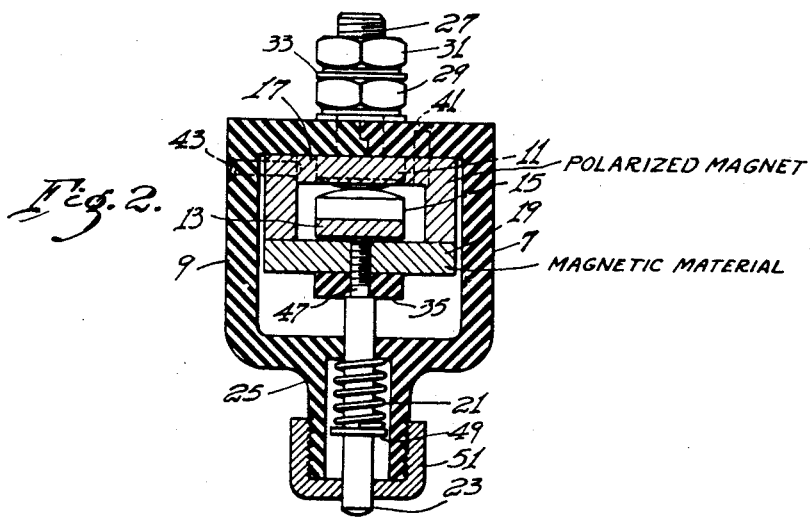
Figure 3:
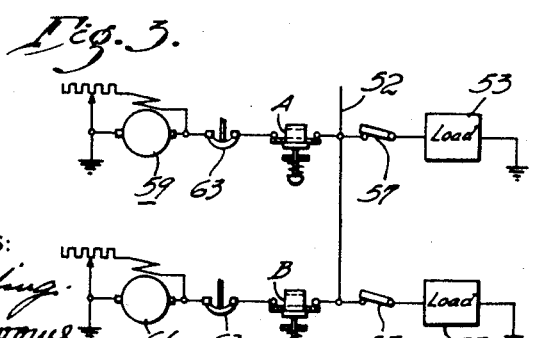

Fig. 2 is a vertical sectional view of the circuit breaker, taken substantially at the center line of the circuit breaker, and Fig. 3 is a simplified diagrammatic view showing part of an electrical power system for an aircraft, including a pair of generators connected by circuit breakers of the present invention to the main bus of the system.

Referring to the drawing, the circuit breaker, in the embodiment of the invention shown, comprises in general a two-part casing 7—9 for enclosing the circuit breaker parts, relatively movable contact means including spaced stationary contacts 11 and a cooperating movable bridging contact member 13 having contacts 15 at each end for engaging the stationary contacts, magnet means for holding the contacts in closed circuit position including a U-shaped stationary magnet 17 and a cooperating movable armature 19 which carries the bridging contact member, spring means 21 for moving the bridging contact member to open circuit position, and a manually operable push button operating member 23 for closing the circuit breaker.

The two-part separable casing is preferably composed of two identical halves 7 and 9 of molded insulating material having interfitting edges, and the lower part of each casing section has a semi-cylindrical neck which fits the corresponding neck portion of the opposite casing part to form a cylindrical collar 25 when the parts are assembled.

The upper walls of the casing parts 7 and 9 are provided with a pair of spaced semi-cylindrical recesses which fit together to form spaced circular openings for receiving and supporting the two contact and terminal studs 27, as shown in Figs. 1 and 2.

The outwardly extending portions of the two terminal studs 27 are threaded for receiving the nuts 29 and 31 and washers 33. Nuts 29 serve to clamp the terminal studs securely to the casing, and the nuts 31 serve to secure the circuit connections to the circuit breaker terminals 27.

The stationary contacts 11 may be formed integral with the terminal studs 27 or as separate elements secured thereto.

The movable bridging contact member 13 is carried by an insulating member comprising a bar 35 of molded insulating material disposed for movement within the casing of the circuit breaker. The movable contact member 13 has a pair of headed guide pins 37 secured thereto on the side opposite the contacts adjacent the ends of the member. These guide pins extend loosely through openings in the ends of the insulating bar 35 so as to permit limited movement of the contact bridging member 13 relative to the carrier bar. A pair of helical springs 39 encircling the guide pins 37 are disposed between the insulating carrier bar and the bridging contact member for biasing the bridging contact member toward the stationary contacts 11 relative to the insulating carrier bar. These springs serve to provide resilient contact pressure engagement of the contacts in the closed circuit position of the circuit breaker, and allow the armature 19 to seat firmly against the poles of the stationary magnet 17.

The magnet means, comprising the U-shaped stationary magnet 17 and the movable armature 19, is preferably composed of permanent magnetic material of high retentivity which is relatively difficult to demagnetize and which exerts a strong attractive force. The magnetization of such a permanent magnet is in a constant direction and is therefore polarized. For some applications, the magnetic means may be made from magnetic material such as iron which is rather easily demagnetized.

The U-shaped stationary magnet 17 is secured by a pair of screws 41 to the upper base portion of the casing section 7 and by a pair of screws 43 to the casing section 9. The two casing parts are thus secured together, and they may be separated to disassemble the breaker by removing either set of screws and loosening the nuts 29 and 31. The stationary magnet 17 is secured in a position between, and spaced from, the stationary contacts 11 with its two legs extending on opposite sides of movable bridging contact member 13.

The movable armature 19 is of square or rectangular outline and is secured by a pair of screws 45 to the center portion of the movable insulating bar 35, between the bar 35 and the contact member 13. The ends of the armature 19 extend beyond the side edges of the insulating carrier bar, and are adapted to squarely engage the pole ends of the stationary U-shaped magnet.

The manually operable operating member 23 for closing the circuit breaker contacts comprises a push button rod, preferably of insulating material, which slidably extends through the collar portion 25 into the casing. The inner end of the operating member has a threaded screw 47 molded therein which threads into threaded openings in the insulating carrier bar and partly into the armature 13 so as to mechanically connect the operating member to the movable contact carrier bar and the armature.

The circuit breaker opening spring 21, of helical form, is disposed in the well formed in the collar portion 25 of the casing. The upper end of the spring bears against an internal shoulder formed on the casing sections, and the lower end engages a collar 49 on the manual operating member 23. The spring 21 exerts a downward force on the operating member 23 tending to move the movable contact carrier bar and the movable contact means and armature to open circuit position. The open circuit position of these parts is determined by the heads of the guide pins 37 engaging recesses in the lower wall of the insulating casing.

Since the armature 19 is secured to the carrier bar 35, the movable contact means 13—15 are carried by the armature 19 and are mounted for limited movement relative to the armature.

A cap 51 of metal or other suitable material is threaded on the collar portion 25 of the casing, and the lower end of the push button operating member 23 extends through an opening provided therefor in the cap.

Suitable arc-extinguishing means, of any well-known type (not shown), may be provided adjacent the contacts for extinguishing the arcs drawn at the two sets of contacts, if desired.

Fig. 3 is a simplified schematic diagram showing some of the main parts of a direct-current power system of a two-engined aircraft provided with a pair of the directional-current circuit breakers of the present invention for protecting the two generators. A portion of the main supply bus of the system is shown at 52. The various electrical load devices of the aircraft such as the lighting and control equipment are connected to the main bus to be supplied with power therefrom. Two of the load devices are shown at 53 and 55 electrically connected to the bus through control switches or conventional circuit breakers 57. The two engines of the aircraft drive direct current generators 59 and 61. These generators are electrically connected in parallel to the main bus 51 through conventional control switches or manually and automatically operable overload circuit breakers 63.

Directional current circuit breakers A and B, each of the construction shown in Figs. 1 and 2, are electrically connected in series in the connections of the generators 59 and 61, respectively, to the main bus 51. Each circuit breaker A and B is electrically connected to its corresponding generator in such a way that the flow of current in the proper direction when the generator is supplying power to the bus tends to maintain the permanent magnet of the breaker magnetized to aid in holding the contacts closed.

The operation of the apparatus is briefly as follows: The directional-current circuit breaker is manually closed by pushing the operating member 23 inwardly to cause the insulating carrier bar to move the bridging contact member 13 and movable contacts 15 into engagement with the stationary contacts 11. This completes the circuit through the breaker for connecting the corresponding generator to the main bus 51. When the circuit breaker is closed, the armature 19 engages the pole ends of the U-shaped permanent magnet 17 and is firmly held in attracted position thereby by the magnetic force. Since the armature is connected to the insulating carrier bar 13, the holding force acts through the carrier bar 13 and contact springs 39 to firmly resiliently hold the contacts 15 in engagement with the stationary contacts. The opening spring 21 is designed so that the opening force exerted thereby tending to open the contacts is a predetermined substantial amount less than the holding force of the permanent magnetic means so that the contacts will be strongly held closed until the magnetic means is demagnetized a substantial amount.

Assuming that each generator is supplying power to the main bus, the flow of current is in the proper direction, and since the current flow through the contacts of each breaker loops the magnetic circuit of the magnetic holding means, it tends to maintain the permanent magnetic means strongly magnetized, or to increase the magnetization thereof, so that the contact means of the breaker are held strongly in closed position during the flow of current in the proper direction.

The magnetic holding means 17—19 and the opening spring 21 are designed so that when the direction of current flow reverses and the reverse current is in excess of a predetermined magnitude, for example, above 300–400 amperes in the case of an aircraft power system, the reverse flow of current demagnetizes the magnetic holding means 17—19 sufficiently to allow the spring 21 to quickly open the contacts 11—15.

Upon the occurrence of a fault condition in any generator of the system in such a fashion as to draw power from the main bus 51, the direction of current flow reverses and starts to demagnetize the permanent magnetic holding means 17—19 of the corresponding directional current circuit breaker, and when the reverse current reaches a predetermined value, the permanent magnetic holding means of the circuit breaker is demagnetized sufficiently to release the armature 19 and permit the circuit breaker opening spring 21 to quickly open the contact means 11—15 of the breaker. The circuit breaker thus automatically interrupts the reverse flow of power to the faulted generator and disconnects the generator from the main bus. The remaining generator continues to supply power to the main bus and load devices so that there is no interruption of the electrical service.

If the fault condition is of a temporary or transient nature, the operator may reset the tripped directional-current circuit breaker to closed position whereupon the flow of current in the proper direction, assuming the fault has been cleared, will remagnetize the permanent magnetic means 17—19, and the contacts will be held closed until the next fault operation. However, if the fault condition is of a permanent nature, the magnetic means is again demagnetized and will not hold the contacts closed. When the faulted generator has been repaired or replaced, the directional-current circuit breaker may be reset manually to closed position, whereupon the forward flow of current tends to remagnetize the magnetic holding means 17—19 and the contact means are again held in closed position until the next fault operation.

While the invention has been illustrated in Fig. 3 as applied to an aircraft electrical power system embodying two generators, it will be understood that it is applicable to electrical power systems embodying any number of generators, there being one directional-current circuit breaker provided for each generator of the system.

The circuit breaker of the present invention is of very simple and inexpensive construction and its compact size and lightness in weight make it particularly suitable for aircraft power systems.

Although a preferred embodiment of the invention has been disclosed in accordance with the provisions of the Patent Statutes, it is to be understood that various changes may be made in the details of construction combinations and arrangements of parts without departing from the essential features of the invention.

I claim as my invention:

1. A directional-current circuit breaker comprising current conducting means including relatively movable contact means, operating means for closing said contact means, polarized magnetic means and a cooperating armature connected to one of said contact means and having unidirectional magnetic flux therein for magnetically holding said contact means closed when the breaker is in closed position and no current is flowing through the breaker, said polarized magnetic means being disposed with respect to the current carrying means of said breaker that the magnetic flux set up by the current flow through the current carrying means is in the same direction as said unidirectional flux and also magnetically holds said contact means closed during the flow of current in one direction through said breaker and the magnetic flux set up by current flow through the current carrying means in the reverse direction opposes said unidirectional magnetic flux and reduces its holding force to cause opening of said contact means upon the flow of current of predetermined magnitude in the reverse direction through said circuit breaker.

2. A directional-current circuit breaker comprising current conducting means including stationary contact means and cooperating movable contact means, operating means for closing said contact means, permanent magnetic means comprising a magnet and a cooperating armature one of which carries said movable contact means and is movable therewith for magnetically holding said contact means closed when the breaker is in closed position and no current is flowing through the breaker, said permanent magnetic means being disposed with respect to a portion of the current conducting means so that said permanent magnetic means magnetically holds said contacts closed during the flow of current in one direction through said circuit breaker and its holding force is reduced to cause opening of said contact means upon the flow of current of predetermined magnitude in the reverse direction through said circuit breaker.

3. A directional-current circuit breaker comprising current conducting means including relatively movable contact means, spring means for biasing said contact means to open position, operating means for closing said contact means, permanent magnetic means for magnetically holding said contact means closed comprising a permanent magnet and a cooperating armature one of which carries one of said contact means and is movable therewith, said permanent magnetic means being disposed with respect to a portion of said current conducting means so that said permanent magnetic means magnetically holds said contact means closed against the bias of said spring means when there is no current flow through the breaker and during the flow of current in one direction through said breaker and releases said contact means to cause opening thereof upon flow of current of predetermined magnitude in the reverse direction.

4. A directional-current circuit breaker comprising a pair of spaced stationary contact means, cooperating movable bridging contact means for engaging and bridging said stationary contact means, spring means biasing said movable contact means to open position, permanent magnetic means for magnetically holding said bridging contact means in engagement with said stationary contact means when the circuit breaker is in closed position comprising a U-shaped permanent magnet disposed between said stationary contact means and a cooperating armature, and an operating member for moving said movable contact means to closed circuit position, said permanent magnetic means acting to magnetically hold said contact means closed against the bias of said spring means when there is no current flow through the breaker and during the flow of current in one direction through said circuit breaker and releasing said movable contact means to cause opening thereof upon the flow of current of predetermined magnitude in the reverse direction.

5. A directional-current circuit breaker comprising a pair of spaced stationary contacts, a cooperating movable bridging contact, opening spring means for moving said bridging contact to open circuit position, permanent magnet means for magnetically holding said bridging contact in closed circuit position comprising a stationary U-shaped magnet disposed between said stationary contacts to be energized by the flow of current in one direction and a cooperating armature carrying said movable contact for movement therewith and for limited movement relative thereto, spring means carried by said armature for biasing said bridging contact toward said stationary contact, and a manually operable push button for moving said armature and bridging contact to closed circuit position, said permanent magnetic means acting to magnetically hold said bridging contact in closed circuit position during the flow of current in said one direction through the breaker and having its holding force reduced sufficiently to cause opening of said movable contact upon flow of current of predetermined magnitude in the reverse direction.

6. A directional-current circuit breaker comprising a pair of spaced stationary contacts, a cooperating movable bridging contact, a movable carrier of insulating material carrying said bridging contact for movement therewith and for limited movement relative thereto, contact pressure spring means carried by said insulating carrier for biasing said bridging contact toward said stationary contacts, opening spring means for moving said carrier and bridging contact to open circuit position, permanent magnet means for holding said bridging contact in closed circuit position when said circuit breaker is closed comprising a U-shaped magnet disposed between said stationary contacts to be energized by the flow of current in one direction through the circuit breaker and a cooperating armature, means securing one of the parts of said permanent magnet means to said insulating carrier, and a manually operable push button connected to said insulating carrier for moving said bridging contact to closed position, said permanent magnetic means acting to hold said bridging contact in closed circuit position during the flow of current in said one direction through the circuit breaker and having its holding force reduced by the flux set up by current flow in reverse direction in the bridging contact to cause opening of said contacts in response to the flow of current in the reverse direction reaching a predetermined magnitude.

7. A directional-current circuit breaker comprising a pair of spaced stationary contacts, a cooperating movable bridging contact, a movable carrier of insulating material carrying said bridging contact for movement therewith and for limited movement relative thereto, contact pressure spring means carried by said insulating carrier for biasing said bridging contact toward said stationary contacts, opening spring means for moving said carrier and bridging contact to open circuit position, permanent magnet means for magnetically holding said bridging contact in closed circuit position when said circuit breaker is closed comprising a stationary U-shaped magnet disposed between said stationary contacts to be energized by the flow of current in one direction through the circuit breaker and a cooperating armature secured to said insulating carrier, a manually operable push button connected to said insulating carrier for moving said bridging contact to closed position, said permanent magnetic means acting to magnetically hold said said bridging contact in closed circuit position during the flow of current in said one direction through the circuit breaker and having its holding force reduced to cause opening of said contacts in response to the flow of current of predetermined magnitude in the reverse direction, and an insulating casing for enclosing the aforementioned parts of said circuit breaker and having an opening through which a portion of said push button extends.

8. In a directional current circuit breaker, cooperating relatively movable contact means having current normally flowing therethrough in one direction when in closed position, spring means for moving said contact means to open position, polarized magnet means for magnetically holding said contact means closed against said spring means at all times when the breaker is in closed position except upon flow of current through said contact means in the reverse direction, and a manually operable operating member for moving said contact means to closed position against said spring means, said polarized magnetic means being neutralized by the magnetic flux caused by flow of current of predetermined magnitude in the reverse direction through said contact means to permit said spring means to move said contact means to open position.

9. In a directional-current circuit breaker, relatively movable contacts, means biasing one of said contacts to separated position, a strip of conducting material having one of said contacts fastened thereto, magnet and armature means disposed around said strip of conducting material and polarized to have unidirectional magnetic flux therein when no current is flowing in said strip of conducting material and applying a force to said contacts magnetically holding them closed against said biasing means, terminals connecting said contacts and said strip of conducting material in circuit with the direction of current flow normally in one direction, and the magnetic flux set up by current flow in said strip of conducting material upon flow of current of predetermined magnitude in reverse direction counteracting said unidirectional flux of the polarized magnet means enough to permit said biasing means to separate said contacts.

10. In a directional-current circuit breaker, relatively movable contacts, means biasing one of said contacts to separated position, a strip of conducting material having one of said contacts fastened thereto, magnet and armature means disposed around said strip of conducting material and polarized to have unidirectional magnetic flux therein when no current is flowing in said strip of conducting material and applying a force to said contacts magnetically holding them closed against said biasing means, terminals connecting said contacts and said strip of conducting material in circuit with the direction of current flow normally in one direction, the magnetic flux set up by current flow in said strip of conducting material upon flow of current of predetermined magnitude in reverse direction counteracting said unidirectional flux of the polarized magnet means enough to permit said biasing means to separate said contacts, and manually operable means for moving one of said contacts against said biasing means to a position where the contacts may be held closed by said unidirectional flux of the magnet and armature means.

BASCUM O. AUSTIN.

REFERENCES CITED

The following references are of record in the file of this patent:

UNITED STATES PATENTS

| Number | Name | Date |
|---|---|---|
| Re.18,630 | Van Sickle | Oct. 18, 1932 |
| 613,406 | Biddle | Nov. 1, 1898 |
| 1,080,058 | Hart | Dec. 2, 1913 |
| 1,186,770 | Hallock | June 13, 1916 |
| 1,248,084 | Curtis | Nov. 27, 1917 |
| 1,480,970 | Trencham et al. | Jan. 15, 1924 |
| 1,975,172 | Parsons | Oct. 2, 1934 |
| 2,020,952 | Lenehan | Nov. 12, 1935 |
| 2,342,791 | Cox | Feb. 29, 1944 |

FOREIGN PATENTS

| Number | Country | Date |
|---|---|---|
| 672,681 | Germany | Mar. 8, 1939 |
| 695 | Great Britain | 1900 |